[12] United States Patent
Sullivan et al.

(10) Patent No.: US 6,253,541 B1
(45) Date of Patent: Jul. 3, 2001

(54) TRIPLE OXYGEN SENSOR ARRANGEMENT

(75) Inventors: Raymond J. Sullivan, Royal Oak; Bruce H. Teague, Grosse Pointe Park; Kenneth P. DeGroot, Macomb Twp.; Michael J. Reale, Royal Oak, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/371,541

(22) Filed: Aug. 10, 1999

(51) Int. Cl.$^7$ ........................................................ F01N 3/00
(52) U.S. Cl. ................. 60/274; 60/276; 60/285; 73/118.1; 73/489
(58) Field of Search ............................ 60/274, 276, 285; 73/118.1, 489

(56) References Cited

U.S. PATENT DOCUMENTS

| | | | |
|---|---|---|---|
| 4,926,826 | * | 5/1990 | Nakaniwa et al. .................... 123/489 |
| 5,099,647 | * | 3/1992 | Hamburg ................................ 60/274 |
| 5,159,810 | * | 11/1992 | Grutter et al. ......................... 60/276 |
| 5,414,994 | * | 5/1995 | Cullen et al. .......................... 60/274 |
| 5,509,267 | * | 4/1996 | Theis ..................................... 60/274 |
| 5,568,725 | * | 10/1996 | Uchikawa ............................. 60/274 |
| 5,644,912 | * | 7/1997 | Kawamura ............................ 60/276 |
| 5,740,676 | * | 4/1998 | Agustin et al. ........................ 60/276 |
| 5,743,084 | * | 4/1998 | Hepburn ................................ 60/274 |
| 5,894,725 | * | 4/1999 | Cullen et al. .......................... 60/274 |

FOREIGN PATENT DOCUMENTS

406323184A * 11/1994 (JP) .

* cited by examiner

Primary Examiner—Thomas Denion
Assistant Examiner—Thai-Ba Trieu
(74) Attorney, Agent, or Firm—Mark P. Calcaterra

(57) ABSTRACT

An exhaust system is provided including two catalysts and three oxygen sensors. The second catalyst is disposed downstream of the first catalyst. The first oxygen sensor is disposed upstream of the first catalyst, the second oxygen sensor is disposed downstream of the first catalyst and upstream of the second catalyst, and the third oxygen sensor is disposed downstream of the second catalyst. A goal voltage corresponding to a desired level of nitrous oxide and hydrocarbon within the exhaust is provided for the third oxygen sensor. This goal voltage is based on engine RPM and MAP. The engine controller compares the goal voltage to an actual voltage generated by sensing the level of oxygen downstream of the second catalyst. Based on this comparison, an error value between the goal voltage and the actual voltage is obtained. This error value is converted into a goal voltage for the first oxygen sensor. An actual voltage generated by the first oxygen sensor sensing the amount of oxygen upstream of the first catalyst is compared to the goal voltage derived from the third oxygen sensor. The difference between the goal voltage and actual voltage is used to modulate the pulse width of a signal sent to the fuel injectors of an engine such that the amount of fuel delivered by the fuel injectors is modified. The second oxygen sensor generates an actual voltage corresponding to the amount of oxygen the second oxygen sensor senses downstream of the first catalyst and upstream of the second catalyst. Changes in the actual voltage generated by the second oxygen sensor are compared to changes in the actual voltage generated by the first oxygen sensor. By monitoring the nature of theses changes as they relate to one another, the performance of the first catalyst can be determined.

16 Claims, 4 Drawing Sheets

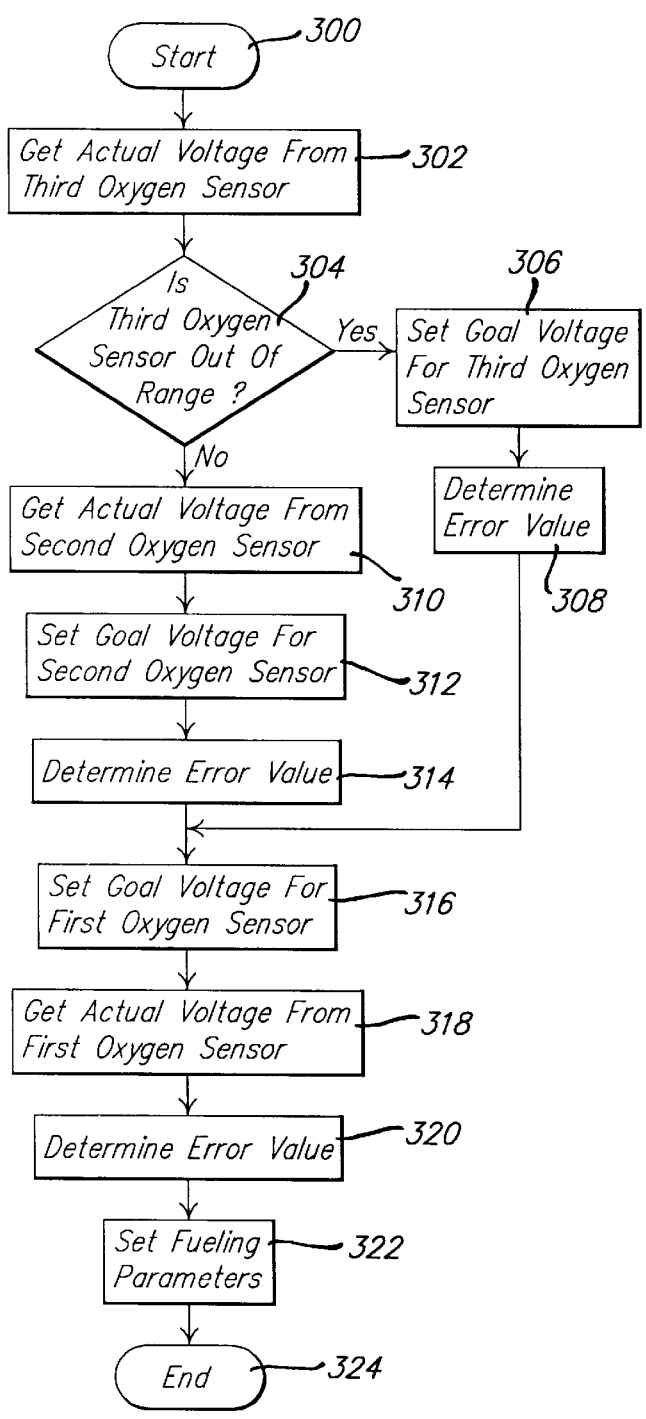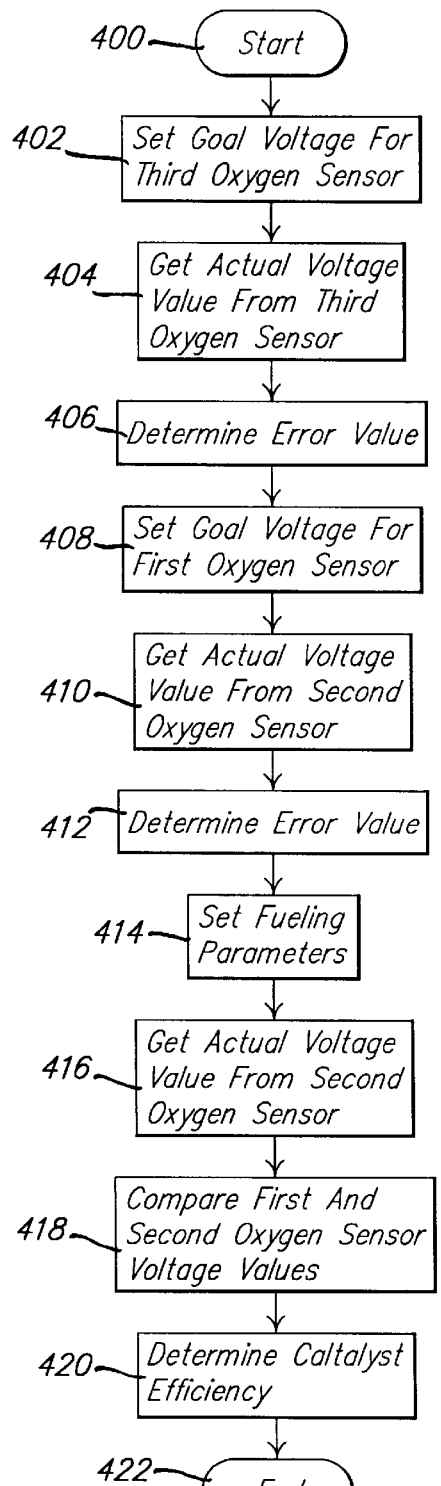

TRIPLE OXYGEN SENSOR ARRANGEMENT

BACKGROUND OF THE INVENTION

1. Technical Field

The present invention generally relates to emission control systems and, more particularly, to oxygen sensor-based emission control systems for automotive vehicles.

2. Discussion

Operation of an internal combustion engine causes certain exhaust elements to be generated. For instance, hydrocarbons (HC) and nitrous oxide (NOx) emissions are produced. Certain air quality management plans dictate that such emissions be controlled to within pre-selected limits.

To reduce the amount of undesirable emissions passing through an engine exhaust system to the atmosphere, modern motor vehicles employ a catalytic converter. The catalytic converter fosters a reaction wherein undesirable emission elements are converted to different elements prior to their passage to the atmosphere. To monitor the efficiency of the catalytic converter, sensors are sometimes employed.

For example, an oxygen sensor may be disposed upstream of a catalyst in the catalytic converter so that the nature of the exhaust gasses entering the catalyst may be determined. If the constituents of the exhaust gas are not within a desirable range, the output of the oxygen sensor is used to modify the fuel-to-air ratio within the engine. Often, this entails increasing or decreasing the amount of fuel injected by the fuel injectors in the engine. As a result, the constituents within the exhaust gas are modified.

Similarly, by disposing an oxygen sensor downstream of the catalyst, the constituents of the exhaust gas exiting the catalyst can be learned. If the constituents are not within the desired range, the fuel-to-air ratio within the engine can be modified. Further, by placing a first oxygen sensor upstream of the catalyst and a second oxygen sensor downstream of the catalyst, the nature of the exhaust gas through the catalyst can be learned. As such, greater control of the fuel-to-air ratio within the engine may be exercised to modify the exhaust constituents.

In some automotive vehicles, a second catalyst brick is employed in the catalytic converter can downstream of the first catalyst brick. In combination with such an arrangement, a first oxygen sensor has been placed upstream of the first catalyst and a second oxygen sensor has been disposed downstream of the first catalyst and upstream of the second catalyst. This is the so-called "mid-brick" position. While this configuration has provided beneficial results for learning the constituents through the first catalyst and entering the second catalyst, there is room for improvement in the art.

For example, it would be desirable to provide a configuration that enables learning of the constituents through the second catalyst thereby enhancing control of the level of nitrous oxide passing through the system.

SUMMARY OF THE INVENTION

The above and other objects are provided by an exhaust system including two catalysts and three oxygen sensors. The second catalyst is disposed downstream of the first catalyst. The first oxygen sensor is disposed upstream of the first catalyst, the second oxygen sensor is disposed downstream of the first catalyst and upstream of the second catalyst, and the third oxygen sensor is disposed downstream of the second catalyst. A goal voltage corresponding to a desired level of nitrous oxide within the exhaust is provided for the third oxygen sensor. This goal voltage is based on engine RPM and MAP. The engine controller compares the goal voltage to an actual voltage generated by sensing the level of oxygen downstream of the second catalyst. Based on this comparisons an error value between the goal voltage and the actual voltage is obtained. This error value is converted into a goal voltage for the first oxygen sensor. An actual voltage generated by the first oxygen sensor sensing the a mount of oxygen upstream of the first catalyst is compared to the goal voltage derived from the third oxygen sensor. The difference between the goal voltage and actual voltage is used to modulate the pulse width of a signal sent to the fuel injectors of an engine such that the amount of fuel delivered by the fuel injectors is modified. The second oxygen sensor generates an actual voltage corresponding to the amount of oxygen the second oxygen sensor senses downstream of the first catalyst and upstream of the second catalyst. Changes in the actual voltage generated by the second oxygen sensor are compared to changes in the actual voltage generated by the first oxygen sensor. By monitoring the nature of these changes as they relate to one another, the performance of the first catalyst can be determined.

BRIEF DESCRIPTION OF THE DRAWINGS

In order to appreciate the manner in which the advantages and objects of the invention are obtained, a more particular description of the invention will be rendered by reference to specific embodiments there of which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 5 is a flowchart illustrating a third embodiment methodology of the present invention; and FIG. 6 is a flowchart illustrating a fourth embodiment methodology of the present invention.

DETAILED DESCRIPTION OF THE PREFERRED EMBODIMENT

The present invention is directed towards a fuel control system for a motor vehicle engine. The fuel control system includes multiple oxygen sensors disposed at pre-selected locations relative to a pair of catalysts along an exhaust system coupled to the engine. By relating the results of one oxygen sensor to another, greater control of the fuel system is provided thereby enabling greater control over exhaust emissions. Further, by comparing the outputs from one oxygen sensor to another, the performance of the catalyst may be determined.

Figure 1:
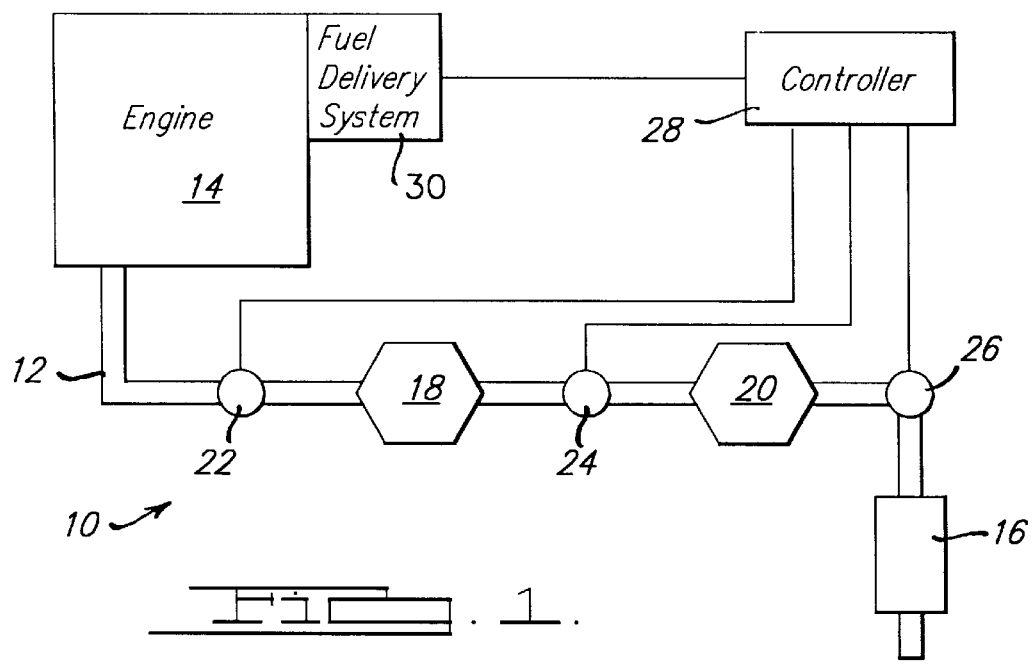
FIG. 1 is a schematic illustration of an exhaust system in accordance with the present invention.

Turning now to the drawing figures, FIG. 1 schematically illustrates an exhaust system for an automotive vehicle generally at 10. The exhaust system 10 includes an exhaust pipe 12 connected to an internal combustion engine 14 at a first end and terminating in a muffler 16 at a second end. A first or upstream catalyst 18 is disposed along the exhaust pipe 12 between the engine 14 and muffler 16. A second or downstream catalyst 20 is disposed along the exhaust pipe 12 downstream of the first catalyst 18 and upstream of the muffler 16.

A first or upstream oxygen sensor 22 is disposed along the exhaust pipe 12 upstream of the first catalyst 18. A second or mid-brick oxygen sensor 24 is disposed downstream of the first catalyst 18 and upstream of the second catalyst 20. A third or downstream oxygen sensor 26 is disposed downstream of the second catalyst 20.

The first oxygen sensor 22, second oxygen sensor 24, and third oxygen sensor 26 are electrically connected to a controller 28 such as the ECU. The controller 28 also communicates with a fuel delivery system 30 associated with the engine 14. Preferably, the fuel delivery system 30 is in the form of fuel injectors.

Figure 2:
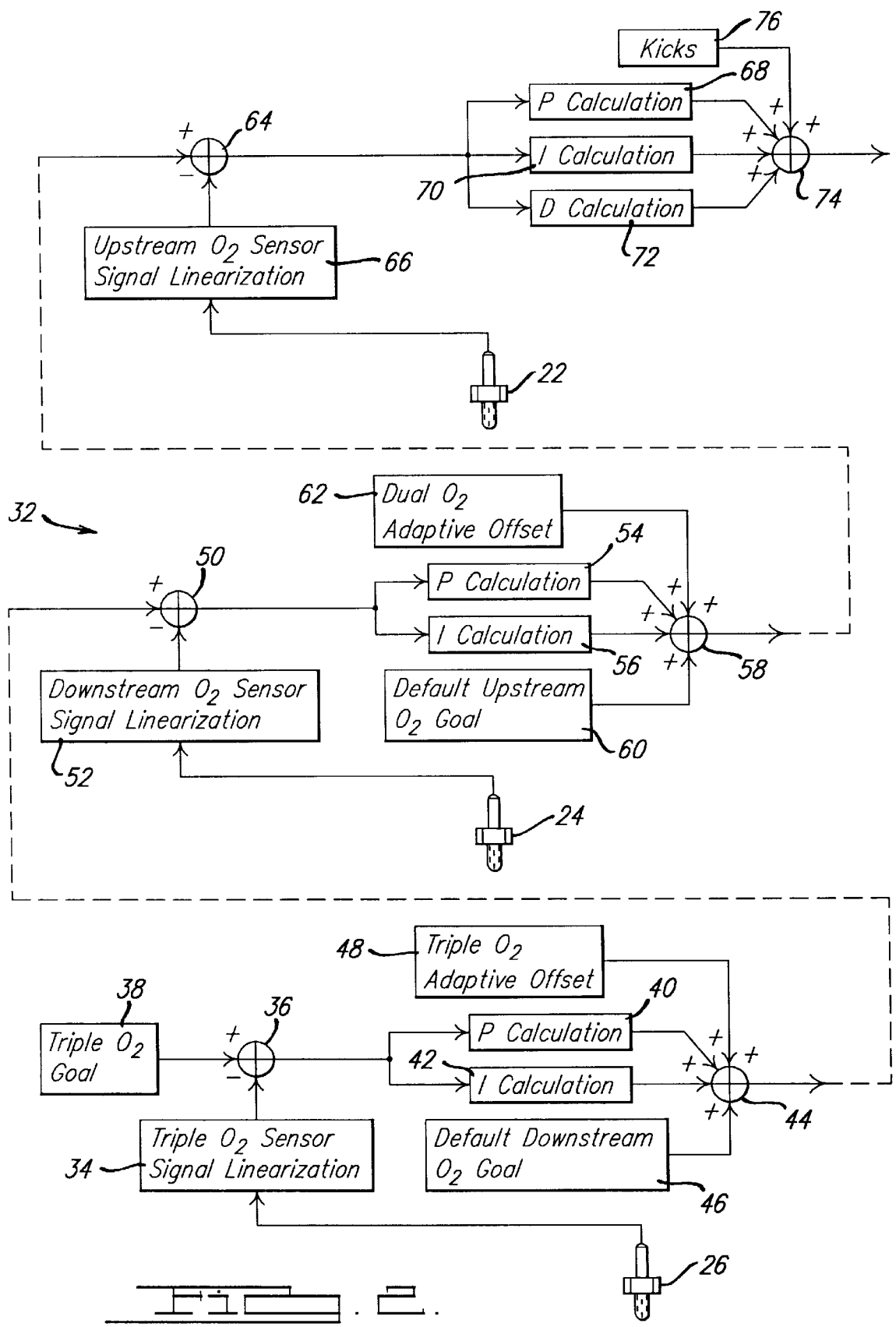
FIG. 2 is a schematic illustration of the control system for use in conjunction with the exhaust system of FIG. 1.

Turning now to FIG. 2, a schematic illustration of a control system for the exhaust system 10 of FIG. 1 is shown generally at 32. Preferably, the control system 32 is implemented in a controller such as the controller 28 of FIG. 1. Initially, the third oxygen sensor 26 determines the amount of oxygen in the exhaust downstream of the second catalyst. The level of oxygen sensed by the third oxygen sensor 26 manifests itself as a voltage signal generated by the third oxygen signal, for example 500–900 mv. The voltage signal from the third oxygen sensor 26 is passed through a signal linearization step 34 where the signal is converted to a more usable form.

The linearized signal from step 34 is sent to a comparator 36. The comparator 36 also receives a goal voltage signal from a table 38. The table 38 includes a plurality of voltages therein corresponding to engine RPM and MAP. As such, depending on the engine RPM and MAP, a different goal voltage for the third oxygen sensor 26 is provided from the table 38. At the comparator 36, the linearized voltage from the third oxygen sensor 26 is compared to the goal voltage from table 38. The difference therebetween represents an error value.

The error value from comparator 36 is sent to a proportional calculation block 40 and an integral calculation block 42. The proportionalized error value and the integrated error value are forwarded from blocks 40 and 42 to comparator 44. The comparator 44 also receives a default downstream oxygen sensor goal from block 46. This default goal represents a fairly optimized goal voltage for the second oxygen sensor to be used when the third oxygen sensor output is unreliable (during warm-up, for example).

The comparator 44 also receives an oxygen adaptive off-set value from block 48. The adaptive off-set value at block 48 is learned over time to further optimize goal voltage for the second oxygen sensor when the third oxygen sensor output is unreliable. The comparator 44 combines the default downstream oxygen sensor goal value from block 46, the integrated error value from block 42, the proportionalized error value from block 40, and the adaptive off-set value from block 48 into a second oxygen sensor goal value.

The second oxygen sensor goal value is forwarded from comparator 44 to comparator 50. The comparator 50 also receives a linearized voltage signal from the second oxygen sensor 24 after it passes through a downstream oxygen sensor signal linearization step 52. The linearized voltage signal corresponds to an amount of oxygen in the exhaust sensed by the second oxygen sensor 24 between the first and second catalysts. According to this configuration, the output signal from the third oxygen sensor 26 becomes a basis for the goal voltage for the second oxygen sensor 24.

The difference between the goal voltage dictated by the third oxygen sensor 26 and the actual voltage sensed by the second oxygen sensor 24 determined at comparator 50 is sent to a proportional calculation block 54 and an integral calculation block 56. The proportionalized error signal from block 54 and integrated error signal from block 56 are sent to a comparator 58. The comparator 58 also receives a default upstream oxygen sensor goal value from block 60. This default goal value represents a fairly optimized goal voltage for the first oxygen sensor to be used when the second oxygen sensor output is unreliable (during warm-up, for example).

The comparator 58 also receives an oxygen sensor adaptive offset value from block 62. This offset value is learned over time to further optimize goal voltage for the first oxygen sensor when the second oxygen sensor output is unreliable. The comparator 58 combines the default goal value from block 60, the integrated error value from block 56, the proportionalized error value from block 54, and the adaptive offset value from block 62 into a first oxygen sensor goal value.

The first oxygen sensor goal value is sent from comparator 58 to comparator 64. As such, the output signal from the second oxygen sensor 24 becomes the basis for the goal voltage for the first oxygen sensor 22. An actual value of oxygen in the exhaust sensed by the first oxygen sensor 22 upstream of the first catalyst is sent as a voltage signal to an upstream oxygen sensor signal linearization step 66. The linearized voltage signal is sent from step 66 to the comparator 64 where an error value between the actual value sensed by the first oxygen sensor 22 and the goal value dictated by the second oxygen sensor 24 is determined.

The error value from comparator 64 is sent to a proportional calculation block 68, an integral calculation block 70, and a derivative calculation block 72. The proportionalized error value from block 68, the integrated error value from block 70, and the derivative error value from block 72 are sent to a comparator 74. The comparator 74 also receives a kicks value from block 76. The kicks value 76 represents an induced perturbation to insure feedback activity. The kicks value is a fast-acting initial correction applied once each time the error value from comparator 64 changes polarity (as from richer-than-goal to leaner-than-goal). The kicks is a remnant of past control practices. It is retained in the present invention for optional use.

The output from comparator 74 is interpreted by the engine controller as a percent-correction and applied to the pulsewidth modulated output to the fuel delivery system 30 of FIG. 1. The pulse-width of the output signal controls the amount of fuel injected into the engine 14. By increasing and/or decreasing the amount of fuel injected, the fuel-to-air ratio in the engine is varied thereby changing the exhaust gas constituents.

Figure 3:
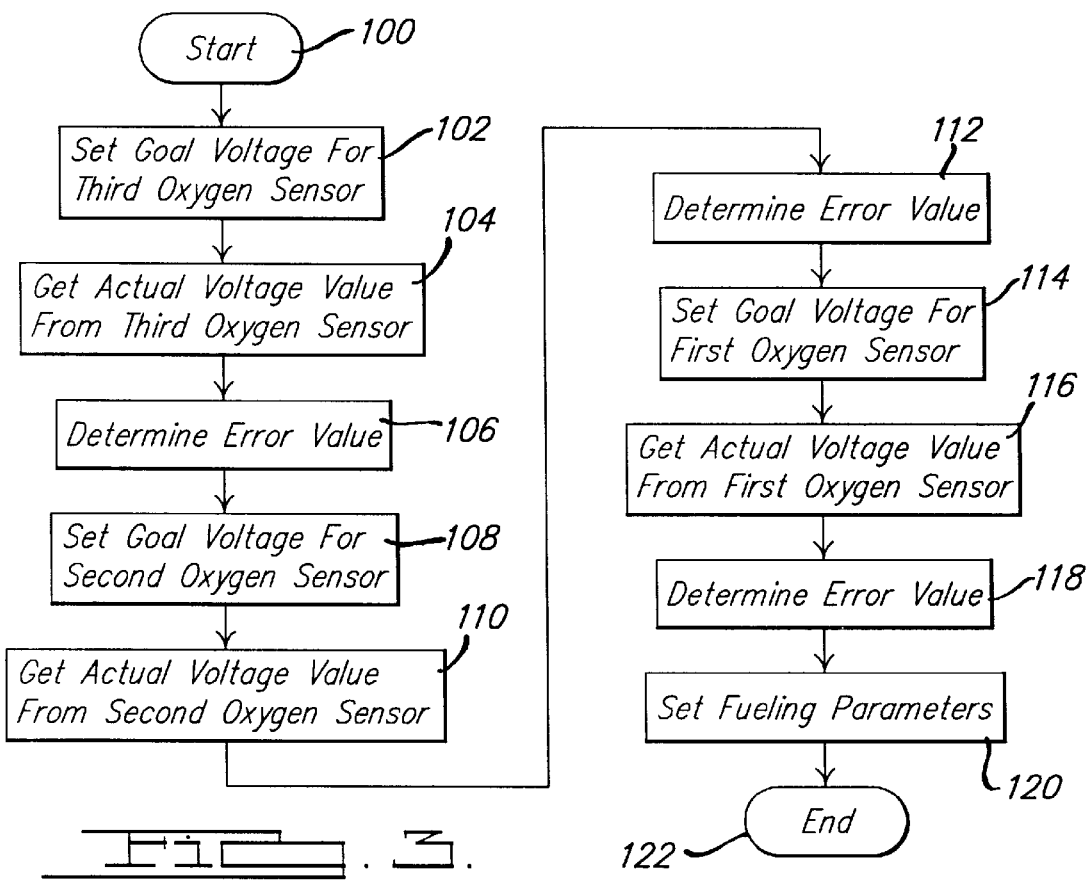
FIG. 3 is a flowchart illustrating a first embodiment methodology of the present invention.

Referring now to FIG. 3, a flow chart depicting a control methodology for operating the system of FIGS. 1 and 2 is illustrated. The methodology starts in bubble 100 and falls through to block 102. In block 102, the methodology sets the goal voltage value for the third oxygen sensor. This goal voltage value is preferably one of a plurality of goal voltages stored in a table and corresponding to engine RPM and MAP. From block 102, the methodology advances to block 104.

In block 104, the methodology reads an actual voltage value generated from the third oxygen sensor. This actual voltage value corresponds to the amount of oxygen sensed by the third oxygen sensor flowing through the exhaust system downstream of the second catalyst. From block 104, the methodology advances to block 106.

In block 106, the methodology compares the goal voltage value from block 102 to the actual voltage value from block 104. The difference between the goal voltage value from the table and the actual voltage value generated by the third oxygen sensor is converted into an error value. From block 106, the methodology continues to block 108.

At block 108, the methodology sets the goal voltage value for the second oxygen sensor based on the error value from block 106. As such, the output signal from the third oxygen sensor is used to dictate the goal value for the second oxygen sensor. From block 108, the methodology continues to block 110.

In block 110, the methodology obtains the actual voltage value from the second oxygen sensor. This actual voltage value is generated by the second oxygen sensor sensing an amount of oxygen in the exhaust system between the first catalyst and the second catalyst. From block 110, the methodology continues to block 112.

In block 112, the methodology compares the second oxygen sensor goal voltage value to the actual voltage value from the second oxygen sensor. The difference between the goal voltage value from block 108 and the actual voltage value from block 110 is converted into an error value. From block 112, the methodology continues to block 114.

In block 114, the methodology sets the goal voltage value for the first oxygen sensor based on the error value from block 112. As such, the output signal from the second oxygen sensor is used to dictate the goal value for the first oxygen sensor. From block 114, the methodology continues to block 116.

In block 116, the methodology obtains an actual voltage value from the first oxygen sensor. The actual voltage value is generated by the first oxygen sensor sensing an amount of oxygen in the exhaust upstream of the first catalyst. From block 116, the methodology advances to block 118.

In block 118, the methodology compares the first oxygen sensor goal voltage value to the actual voltage value from the first oxygen sensor. The difference between the goal voltage value from block 114 and the actual voltage value from block 116 is converted into an error value. From block 118, the methodology advances to block 120.

In block 120, the methodology sets the fueling parameters for the engine according to the error value from block 118. Preferably, the fueling parameters are controlled by varying (i.e., modulating) the pulse-width of a signal sent from the engine controller to the fuel injectors. By controlling the amount of fuel injected, the fuel-to-air ratio within the engine is adjusted and the constituents of the engine emissions are modified. After setting the fueling parameters in block 120, the methodology continues to bubble 122 where it exits the subroutine pending a subsequent execution thereof.

Figure 4:
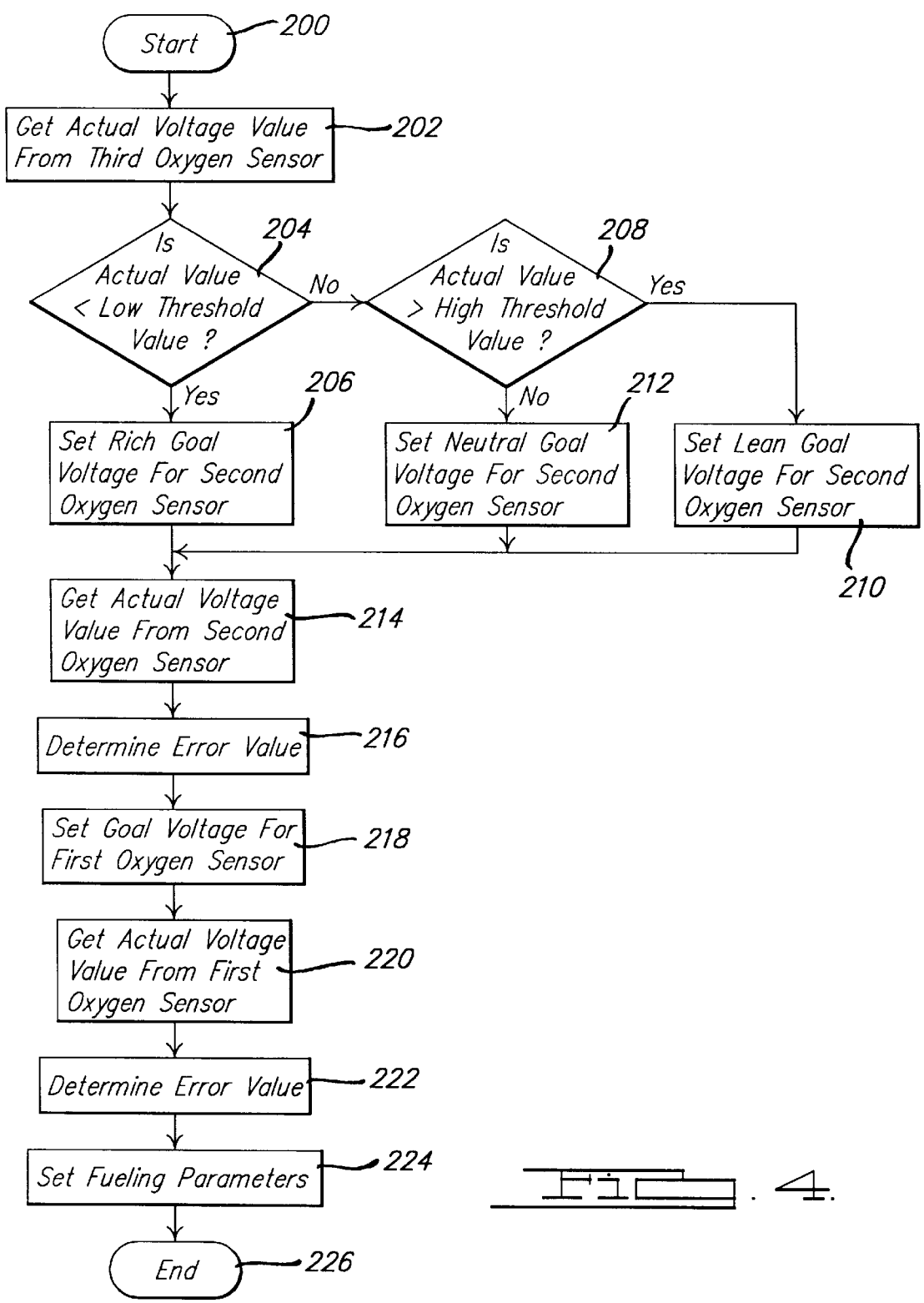
FIG. 4 is a flowchart illustrating a second embodiment methodology of the present invention.

Referring now to FIG. 4, an alternate embodiment control methodology for the exhaust system of FIGS. 1 and 2 is illustrated. This methodology is similar to the methodology of FIG. 3 with the exception that no error is calculated for the third oxygen sensor. Instead, the third oxygen sensor is characterized as high, low, or intermediate with respect to two threshold voltage levels causing one of three possible goal voltages to be applied to the second oxygen sensor. The methodology starts in bubble 200 and falls through to block 202.

In block 202, the methodology obtains an actual voltage value from the third oxygen sensor. The actual voltage value is generated by the third oxygen sensor sensing an amount of oxygen in the exhaust downstream of the second catalyst. From block 202, the methodology advances to decision block 204.

In block 204, the methodology compares the actual voltage value from block 202 to a low threshold value. The low voltage threshold value delineates a boundary between neutral and lean exhaust composition. If the actual voltage value generated by the third oxygen sensor is less than the low voltage threshold value, the methodology advances to decision block 206. In block 206, a rich goal voltage is set for the second oxygen sensor.

Referring again to decision block 204, if, however, the actual voltage value from the third oxygen sensor is greater than or equal to the low voltage threshold value, the methodology advances to block 208. In decision block 208, the methodology compares the actual voltage value from the third oxygen sensor to a high voltage threshold value. The high voltage threshold value corresponds to a boundary between neutral and rich exhaust composition. If the actual voltage value from the third oxygen sensor is greater than the high voltage threshold value, the methodology advances to block 210. In block 210, a lean goal voltage is set for the second oxygen sensor.

Referring again to decision block 208, if, however, the actual voltage value from the third oxygen sensor is less than or equal to the high voltage threshold value, the methodology advances to block 212. In block 212, a neutral goal voltage is set for the second oxygen sensor. From blocks 206, 210, and 212, the methodology continues to block 214.

In block 214, the methodology obtains the actual voltage value from the second oxygen sensor. The actual voltage value is generated by the second oxygen sensor sensing the amount of oxygen in the exhaust between the first and second catalysts. From block 214, the methodology continues to block 216.

In block 216, the methodology compares the goal voltage value from blocks 206, 210, or 212 to the actual voltage value from block 214. The difference between the goal voltage value and the actual voltage value is then converted into an error value. From block 216, the methodology advances to block 218.

In block 218, the methodology sets the goal voltage value for the first oxygen sensor according to the error value determined at block 216. As such, the output from the second oxygen sensor is used as a basis for the goal voltage value for the first oxygen sensor. From block 218, the methodology advances to block 220.

In block 220, the methodology obtains the actual voltage value from the first oxygen sensor. The actual voltage value corresponds to an amount of oxygen sensed in the exhaust upstream of the first catalyst by the first oxygen sensor. From block 220, the methodology advances to block 222.

In block 222, the methodology compares the goal voltage value from block 218 to the actual voltage value from block 220. The difference between the goal voltage value and the actual voltage value is then converted into an error value. From block 222, the methodology advances to block 224.

In block 224, the methodology sets the fueling parameters for the engine according to the error value determined at block 222. Preferably, this is accomplished by pulse width modulating a signal sent from the engine controller to the fuel delivery system in accordance with the error value. From block 224, the methodology advances to bubble 226 and exits the subroutine pending a subsequent execution thereof.

Referring now to FIG. 5, another alternate embodiment control methodology for the exhaust system of FIGS. 1 and 2 is illustrated. This methodology is similar to the previous embodiments except the third oxygen sensor is only employed when its actual value is outside of a pre-selected range. When the actual voltage of the third oxygen sensor is outside of a pre-selected range, the second oxygen sensor is ignored and fueling is controlled by the first and third oxygen sensors. When the actual voltage of the third oxygen sensor is inside of the pre-selected range, fueling is controlled by the first and second sensors. This enables fueling adjustments to be made for control of exhaust composition downstream from the second catalyst only when exhaust composition at that location deviates significantly from the desired composition, simplifying the control methodology from previously described control methodology embodiments. Fueling adjustments are made for control of exhaust composition downstream from the first catalyst and upstream from the second catalyst at all other times.

The methodology starts in bubble 300 and falls through to block 302. In block 302, the methodology obtains the actual voltage value from the third oxygen sensor sensing the level of oxygen in the exhaust downstream of the second catalyst. From block 302, the methodology advances to decision block 304.

In decision block 304, the methodology compares the actual voltage value from the third oxygen sensor obtained at block 302 to a range of voltage values. Preferably, this range is defined by an upper voltage threshold and a lower voltage threshold. If the voltage threshold is outside of the pre-selected range at decision block 304 (i.e., less than the minimum range value or greater than the maximum range value), the methodology advances to block 306. This range of values corresponds to a range outside of which the second catalyst cannot be expected to satisfactorily eliminate exhaust pollutants.

In block 306, the methodology sets the goal voltage value for the third oxygen sensor. This goal voltage value is preferably one of a plurality of goal voltages stored in a table and corresponding to engine RPM and MAP. From block 306, the methodology advances to block 308.

In block 308, the methodology compares the goal voltage value from block 306 to the actual voltage value from block 302. The difference between the goal voltage value from the table and the actual voltage value generated by the third oxygen sensor is converted into an error value.

Referring again to decision block 304, if, however, the voltage threshold is not outside of the pre-selected range (i.e., greater than or equal to the minimum range value and less than or equal to the maximum range value), the methodology advances to block 310.

In block 310, the methodology obtains the actual voltage value for the second oxygen sensor sensing the level of oxygen in the exhaust downstream of the first catalyst and upstream from the second catalyst. From block 310, the methodology advances to block 312.

In block 312, the methodology sets the goal voltage value for the second oxygen sensor. This goal voltage value is preferably one of a plurality of goal voltages stored in a table and corresponding to engine RPM and MAP. From block 312, the methodology advances to block 314.

In block 314, the methodology compares the goal voltage value from block 312 to the actual voltage value from block 310. The difference between the goal voltage value from the table and the actual voltage value generated by the second oxygen sensor is converted into an error value. From blocks 308 and 314, the methodology advances to block 316.

In block 316, the methodology sets the goal voltage value for the first oxygen sensor according to the error value from block 308 or block 314. Thus, the output of the second oxygen sensor or the third sensor becomes the basis for the goal voltage value for the first oxygen sensor. From block 316, the methodology continues to block 318.

In block 318, the methodology obtains the actual voltage value from the first oxygen sensor. The actual voltage value corresponds to an amount of oxygen sensed in the exhaust upstream of the first catalyst by the first oxygen sensor. After obtaining the actual voltage value from the first oxygen sensor at block 318, the methodology continues to block 320.

In block 320, the methodology compares the goal voltage value for the first oxygen sensor from block 316 to the actual voltage value from the first oxygen sensor from block 318. The difference between the goal voltage value and the actual voltage value is then converted into an error value. After determining the error value at block 320, the methodology advances to block 322.

In block 322, the methodology sets the fueling parameters for the engine according to the error value from block 320. Preferably, this is accomplished by pulse width modulating a signal sent from the engine controller to the fuel delivery system in accordance with the error value. From block 322, the methodology advances to bubble 324 and exits the subroutine pending a subsequent execution thereof.

Referring now to FIG. 6, a methodology of utilizing the outputs of the first and second oxygen sensors to determine the general state of the catalytic converters functioning is illustrated. In this embodiment the second oxygen sensor is only used for monitoring catalyst efficiency and is not used in fuel control. Rather, the output signal from the third oxygen sensor is used to set the goal voltage value for the first oxygen sensor. The methodology starts in bubble 400 and falls through to block 402.

In block 402, the methodology sets the goal voltage value for the third oxygen sensor. This goal voltage value is preferably obtained from a table including a plurality of pre-selected values and is selected according to engine RPM and MAP. From block 402, the methodology continues to block 404.

In block 404, the methodology obtains the actual voltage value from the third oxygen sensor. The actual voltage value is generated by the third oxygen sensor sensing the oxygen level in the exhaust downstream of the second catalyst. From block 404, the methodology advances to block 406.

In block 406, the methodology compares the goal voltage value from block 402 to the actual voltage value from block 404. The difference between the goal voltage value and the actual voltage value is then converted into an error value. From block 406, the methodology advances to block 408.

In block 408, the methodology sets the goal voltage value for the first oxygen sensor according to the error value from block 406. As such, the output signal of the third oxygen sensor is used for setting the goal voltage value for the first oxygen sensor. From block 408, the methodology advances to block 410.

In block 410, the methodology obtains the actual voltage value from the first oxygen sensor. The actual voltage value is generated by the first oxygen sensor sensing the level of oxygen upstream of the first catalyst. From block 410, the methodology advances to block 412.

In block 412, the methodology compares the goal voltage value for the first oxygen sensor from block 408 to the actual voltage value from the first oxygen sensor from block 410. The difference between the goal voltage value and the actual voltage value is then converted into an error value at block 412. From block 412, the methodology advances to block 414.

In block 414, the methodology sets the fueling parameters for the engine according to the error value generated at block 412. Preferably, the fueling parameters are controlled by pulse width modulating a signal sent to the fuel injectors of the engine. From block 414, the methodology continues to block 416.

In block 416, the methodology obtains the actual voltage value from the second oxygen sensor. The actual voltage value is generated by the second oxygen sensor sensing the level of oxygen in the exhaust downstream of the first catalyst and upstream of the second catalyst. From block 416, the methodology advances to block 418.

In block 418, the methodology compares the actual voltage value for the first oxygen sensor from block 410 to the actual voltage value from the second oxygen sensor from block 416. The difference over time between the actual voltage values of the first and second oxygen sensors is used to infer an efficiency of the first catalyst. From block 418, the methodology advances to block 420.

In block 420, the methodology determines the efficiency of the first catalyst. Preferably, this is accomplished by comparing the wide swings of the actual voltage values for the first oxygen sensor to the relatively smooth swings of the actual voltage values for the second oxygen sensor. From block 420, the methodology continues to bubble 422 where it exits the subroutine pending a subsequent execution thereof.

Thus, the present invention provides an exhaust system including a plurality of oxygen sensors. The output from one oxygen sensor is used in setting the goal voltage value for another oxygen sensor. As such, the fueling parameters of an engine may be varied to control the nature of the emissions passing through the exhaust system. Further, the outputs from the sensors are compared to determine the functioning of the catalyst.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An exhaust system comprising:
   a first oxygen sensor;
   a first catalyst disposed downstream of said first oxygen sensor;
   a second oxygen sensor disposed downstream of said first catalyst;
   a second catalyst disposed downstream of said second oxygen sensor; and
   a third oxygen sensor disposed downstream of said second catalyst;
   wherein said first oxygen sensor outputs a signal for controlling fuel delivery, said signal used to calculate a difference between a goal value for said first oxygen sensor and an actual value determined by said first oxygen sensor;
   wherein said goal value is dictated by said third oxygen sensor; and
   wherein said goal value output for said first oxygen sensor corresponds to a difference between a second goal value for said third oxygen sensor and an actual value determined by said third oxygen sensor.

2. The system of claim 1 wherein said second goal value is one of a plurality of pre-selected goal values corresponding to a range of operating parameters of an engine associated with said exhaust system.

3. The system of claim 1 wherein said first oxygen sensor generates a first oxygen sensor actual value and said second oxygen sensor generates a second oxygen sensor actual value, a difference between said first and second oxygen sensor actual values corresponding to a performance of said first catalyst.

4. The system of claim 3 wherein said first oxygen sensor actual value corresponds to an amount of oxygen sensed by said first oxygen sensor upstream of said first catalyst, and said second oxygen sensor actual value corresponding to an amount of oxygen sensed by said second oxygen sensor downstream of said first catalyst.

5. A method for controlling an amount of fuel delivered by a fuel system to an engine and for monitoring catalyst performance comprising:
   providing an exhaust system associated with said engine with a first oxygen sensor communicating with said fuel system, a first catalyst downstream of said first oxygen sensor, a second oxygen sensor downstream of said first catalyst, a second catalyst downstream of said second oxygen sensor, and a third oxygen sensor downstream of said second catalyst;
   determining a third oxygen sensor error value between a third oxygen sensor goal value for to said third oxygen sensor and a third oxygen sensor actual value determined by said third oxygen sensor;
   outputting said third oxygen sensor error value as a first oxygen sensor goal value;
   determining a first oxygen sensor error value between said first oxygen sensor goal value and a first oxygen sensor actual value determined by said first oxygen sensor;
   outputting said first oxygen sensor error value as a control signal to said fuel system for varying said amount of fuel delivered to said engine;
   determining a difference value between said first oxygen sensor actual value and a second oxygen sensor actual value determined by said second oxygen sensor; and
   outputting said difference value as a performance indicator for said first catalyst.

6. The method of claim 5 wherein said third oxygen sensor goal value further comprises one of a plurality of pre-selected goal values corresponding to an RPM and MAP condition of said engine.

7. The method of claim 5 wherein said third oxygen sensor goal value further comprises a voltage of said third oxygen sensor corresponding to a desired level of oxygen in said exhaust system downstream of said second catalyst.

8. The method of claim 5 wherein said third oxygen sensor actual value further comprises a voltage of said third oxygen sensor generated according to an amount of oxygen sensed in said exhaust system downstream of said second catalyst.

9. The method of claim 5 wherein said first oxygen sensor actual value further comprises a voltage of said first oxygen sensor generated according to an amount of oxygen sensed in said exhaust system upstream of said first catalyst.

10. The method of claim 5 wherein said second oxygen sensor actual value further comprises a voltage of said second oxygen sensor generated according to an amount of oxygen sensed in said exhaust system downstream of said first catalyst and upstream of said second catalyst.

11. The method of claim 5 wherein said step of varying said amount of fuel delivered by said fuel system further comprises pulse width modulating said control signal sent to said fuel system according to said first oxygen sensor error value.

12. A method of controlling fuel delivery to an engine and montoring catalyst efficiency based on engine exhaust feedback control comprising:

provinding an exhaust system for said engine with a first catalyst and a second catalyst, said second catalyst disposed downstream of said first catalyst;

providing said exhaust system with a first oxygen sensor a second oxygen sensor, and a third oxygen sensor, said first oxygen sensor disposed upstream of said first catalyst and communicating with a fuel delivery mechanism of said engine, said second oxygen sensor disposed downstream of said first catalyst and upstream of said second catalyst, said third oxygen sensor disposed downstream of said second catalyst;

wherein a third oxygen sensor output value is input as a first oxygen sensor goal value for said first oxygen sensor and a first oxygen sensor output value is used to vary said fuel delivery, and wherein a difference value between a first oxygen sensor output value and a second oxygen sensor output value is employed as an efficiency indicator for said first catalyst; and wherein a third oxygen sensor goal value is determined for said third oxygen sensor, said third oxygen sensor goal value corresponding to an RPM and MAP condition of said engine.

13. The method of claim 12 wherein a difference between said third oxygen sensor output value and a first oxygen sensor actual value determined by said first oxygen sensor is converted into a first oxygen sensor error value which is used to vary said fuel delivery.

14. The method of claim 12 wherein said first oxygen sensor output value is used to pulse width modulate a signal to control said fuel delivery.

15. The method of claim 12 wherein said third oxygen sensor output value corresponds to an error value between said third oxygen sensor goal value and a third oxygen sensor actual value generated by said third oxygen sensor sensing an amount of oxygen downstream of said second catalyst, and wherein said first oxygen sensor output value corresponds to an error value between said first oxygen sensor goal value and a first oxygen sensor actual value generated by said first oxygen sensor sensing an amount of oxygen upstream of said first catalyst.

16. The method of claim 12 wherein said second oxygen sensor output value corresponds to a second oxygen sensor actual value generated by said second oxygen sensor sensing an amount of oxygen downstream of said first catalyst and upstream of said second catalyst, and wherein said first oxygen sensor output value corresponds to a first oxygen sensor actual value generated by said first oxygen sensor sensing an amount of oxygen upstream of said first catalyst.

* * * * *

UNITED STATES PATENT AND TRADEMARK OFFICE
CERTIFICATE OF CORRECTION

PATENT NO. : 6,253,541 B1  
DATED : July 3, 2001  
INVENTOR(S) : Sullivan et al.

Page 1 of 1

It is certified that error appears in the above-identified patent and that said Letters Patent is hereby corrected as shown below:

<u>Title page,</u>
Item [75], line 5, add inventor "Mark J. Poublon, Shelby Twp., MI"

Signed and Sealed this

Twenty-sixth Day of March, 2002

Attest:

JAMES E. ROGAN  
*Attesting Officer*  *Director of the United States Patent and Trademark Office*